(12) United States Patent
Russell et al.

(10) Patent No.: US 6,646,782 B1
(45) Date of Patent: Nov. 11, 2003

(54) SOLID-STATE SURFACE PLASMON LIGHT VALVE AND TUNABLE FILTER

(75) Inventors: Stephen D. Russell, San Diego, CA (US); Randy L. Shimabukuro, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/302,326

(22) Filed: Nov. 21, 2002

(51) Int. Cl.[7] ............... G02F 1/00; G02F 1/29; G02F 1/07
(52) U.S. Cl. ............ 359/322; 359/323; 359/315; 359/318; 359/263
(58) Field of Search ................ 359/322, 323, 359/315, 318, 245, 254, 260, 263, 247; 348/744

(56) References Cited

U.S. PATENT DOCUMENTS 5,570,139 A * 10/1996 Wang
6,122,091 A * 9/2000 Russell et al. ............... 359/260
6,211,993 B1 * 4/2001 Wang et al. ................. 359/260

OTHER PUBLICATIONS

Yu Wang, "Voltage–induced color–selective absorption with surface plasmons," Applied Physics Letters, Nov. 6, 1995, vol. 67, No. 19, pp. 2759–2761.

* cited by examiner

Primary Examiner—Georgia Epps
Assistant Examiner—Jack Dinh
(74) Attorney, Agent, or Firm—Celia C. Dunham; Michael A. Kagan; Peter A. Lipovsky

(57) ABSTRACT

An all solid-state light valve and tunable filter that uses color-selective absorption at a metal-dielectric interface by surface plasmons. The solid-state surface plasmon light valve and tunable filter comprises a substrate, a bottom electrode, a solid-state electro-optic material, and a top electrode through which electromagnetic radiation may pass through and whose optical properties may be modified by suitable modulation of an electrical bias, i.e., an applied voltage between the top and bottom electrodes. The bottom electrode must be specifically fabricated using a refractory metal to allow the formation of the solid-state electro-optic material.

6 Claims, 2 Drawing Sheets

SOLID-STATE SURFACE PLASMON LIGHT VALVE AND TUNABLE FILTER

BACKGROUND OF THE INVENTION

This invention relates generally to the fields of optical modulators, light valves, electro-optic filters, projection and flat panel display devices. More specifically, this invention relates to an all solid-state light valve, optical modulating device or optical filter that uses color-selective absorption at a metal-dielectric interface by surface plasmons.

In "Voltage-Induced Color-Selective Absorption with Surface Plasmons," Applied Physics Letters, Volume 67, No. 19, Nov. 6, 1995, pp. 2759–2761, Yu Wang reported on the phenomenon of voltage-induced color-selective absorption at a metal/liquid crystal interface with surface plasmons. The surface plasmon, a collective excitation of electrons, absorbs all incident light at the resonance frequency of the plasmon. When incident p-polarized light is absorbed at the surface plasmon resonance, the reflected light shows the complementary color.

Wang teaches that by using a liquid crystal, whose dielectric constant varies with applied voltage, one can change the resonance frequency of the surface plasmon, which in turn provides a concomitant change in absorption. Changing the dielectric constant of the liquid crystal through the application of voltage results in the reflected light showing a color change.

FIG. 1 schematically shows the prior art as taught by Wang. In this figure, the projection display 10 includes a substrate 11, bottom electrode 12, alignment layers 13, spacers 14, top electrode 15, liquid crystal 16 and seal 17. Alignment layers 13, typically formed by deposition of a polyimide layer and mechanical rubbing of the surface, must be employed to impart a preferred direction to the liquid crystal 16. Spacers 14 are required to set the desired spacing between top electrode 15 and bottom electrode 12. Seal 17 is required to contain liquid crystal 16 between top electrode 15 and bottom electrode 12.

In U.S. Pat. No. 5,570,139, Wang describes a similarly designed liquid crystal embodiment and how this embodiment may be employed in projection display applications.

SUMMARY OF THE INVENTION

The invention relates to an all solid-state light valve and tunable filter that uses color-selective absorption at a metal-dielectric interface by surface plasmons. The solid-state surface plasmon light valve and tunable filter comprises a substrate, a bottom electrode, a solid-state electro-optic material, and a top electrode through which electromagnetic radiation may pass through and whose optical properties may be modified by suitable modulation of an electrical bias, i.e., an applied voltage between the top and bottom electrodes. The bottom electrode must be specifically fabricated using a refractory metal to allow the formation of the solid-state electro-optic material. Alignment layers, spacers, and seals are not required in this embodiment of the solid-state surface plasmon light valve and tunable filter.

BRIEF DESCRIPTION OF THE DRAWINGS

For a more complete understanding of the solid-state surface plasmon light valve and tunable filter, reference is now made to the following detailed description of the embodiments as illustrated in the accompanying drawings, wherein.

DESCRIPTION OF THE EMBODIMENTS

Figure 1:
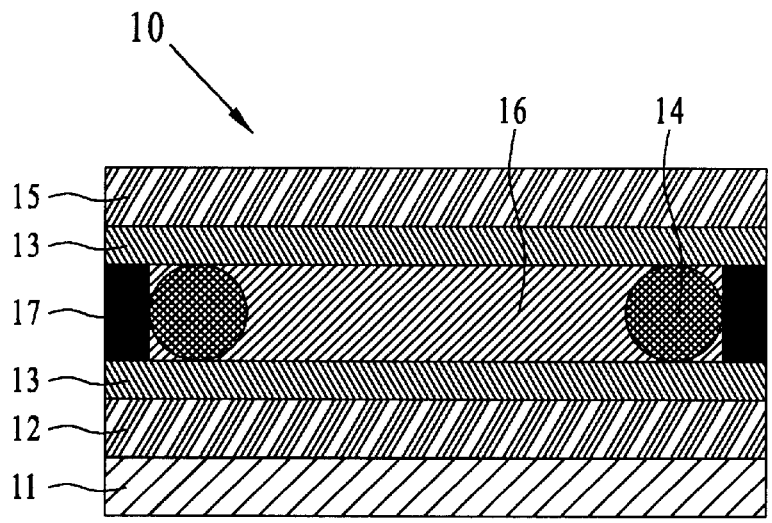
FIG. 1 is a cross-sectional side view of a liquid crystal light valve according to the prior art.
Figure 2:
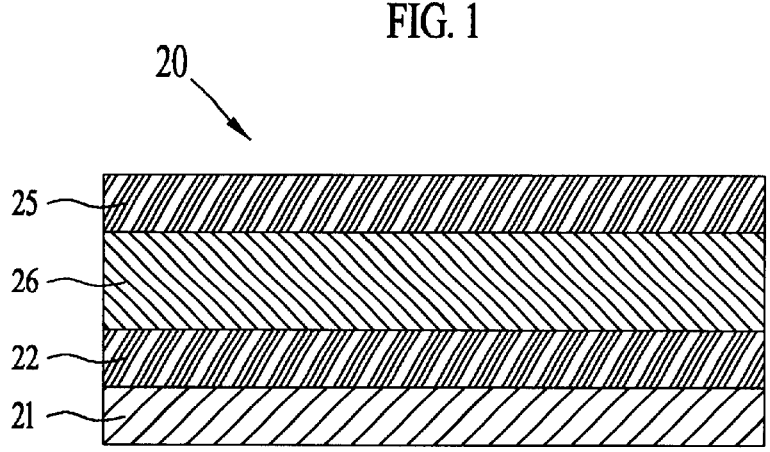
FIG. 2 is a cross-sectional side view of the solid-state light valve and tunable filter.

The first embodiment of a solid-state surface plasmon light valve and tunable filter 20 is shown schematically in FIG. 2. The solid-state surface plasmon light valve and tunable filter 20 comprises a substrate 21, a bottom electrode 22, a solid-state electro-optic material 26, and a top electrode 25 through which electromagnetic radiation may pass through and the optical properties of electro-optic material 26 may be modified by suitable modulation of an electrical bias, i.e., an applied voltage between bottom electrode 22 and top electrode 25. In this embodiment, the bottom electrode 22 must be specifically fabricated using a refractory metal to allow the formation of the solid-state electro-optic material. Alignment layers, spacers, and seals are not required in this embodiment of the solid-state surface plasmon light valve and tunable filter.

Figure 3:
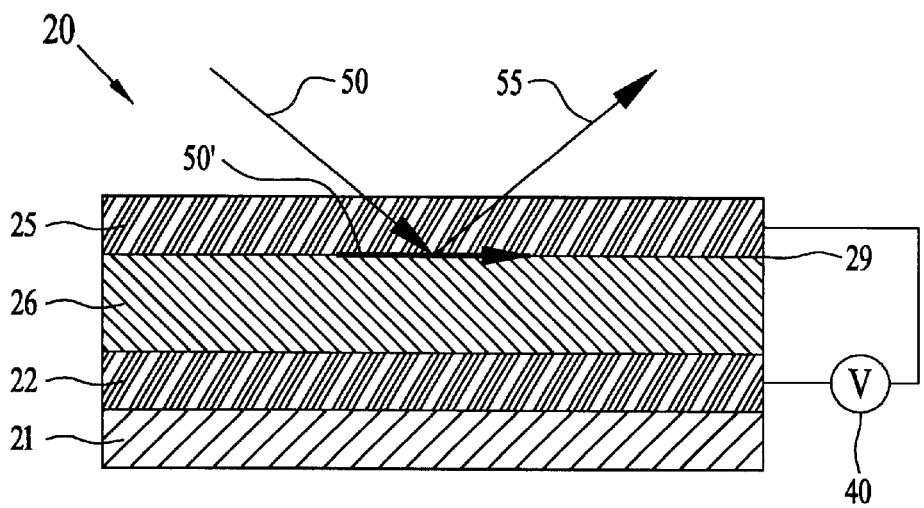
FIG. 3 is a cross-sectional side view of the solid-state light valve and tunable filter illustrating the reflective mode.

Referring to FIG. 3, a reflective mode of operation of the solid-state surface plasmon light valve and tunable filter 20 will be described by way of example. Incident electromagnetic energy 50, for example visible light, is at least partially transmitted through top electrode 25 to impinge on the interface 29 between the solid-state electro-optic material 26 and top electrode 25. An electrical bias is provided by a voltage source 40 that is connected between the bottom electrode 22 and the top electrode 25.

The solid-state electro-optic material 26 is selected from the class of Aurivilius oxides, which possess electro-optic properties. Examples of this class of material include bismuth strontium tantalite and alloys of this material. Other electro-optic materials may be selected which include electro-optic materials with a perovskite structure, such as lead zirconate titanate (PZT) and lead lanthanum zirconate titanate (PLZT). The solid-state electro-optic material 26 may be any material with a suitable refractive index change with respect to voltage and may include electro-optic polymers, in addition to the above-mentioned electro-optic ceramics.

Bottom electrode 22 and top electrode 25 may be comprised of multiple layers of varying composition or contain gradients in composition. Bottom electrode 22 and top electrode 25 may be comprised of similar materials, or the bottom electrode 22 and top electrode 25 may differ. In this embodiment, only the bottom electrode is a refractory metal and is, typically, platinum. Platinum on an adhesion layer of titanium or other refractory metals may also be used.

Top electrode 25 is selected to produce a narrow band or broadband surface plasmon resonance, as desired. For example, a top electrode comprised of nickel or one comprised of a bilayer of aluminum and rhodium produces a broad resonance when placed on a solid-state electro-optic material with a refractive index of about 1.75, whereas other metallic layers, such as silver, produce a narrow surface plasmon resonance.

A component of the electromagnetic energy 50' is absorbed at the resonance frequency of the surface plasmon at the interface 29 between the solid-state electro-optic material 26 and top electrode 25. Hence, the reflected energy 55 differs from the incident electromagnetic energy 50 due to the absorption by surface plasmons at a resonant frequency determined by the optical constants of the solid-state electro-optical material 26, the top electrode 25, the applied voltage 40, and the physical structure of the light valve. If electromagnetic energy 50 is polarized in the plane of the surface plasmon at the interface 29, then reflected energy 55 will be a complementary color to electromagnetic energy 50.

Figure 4A:
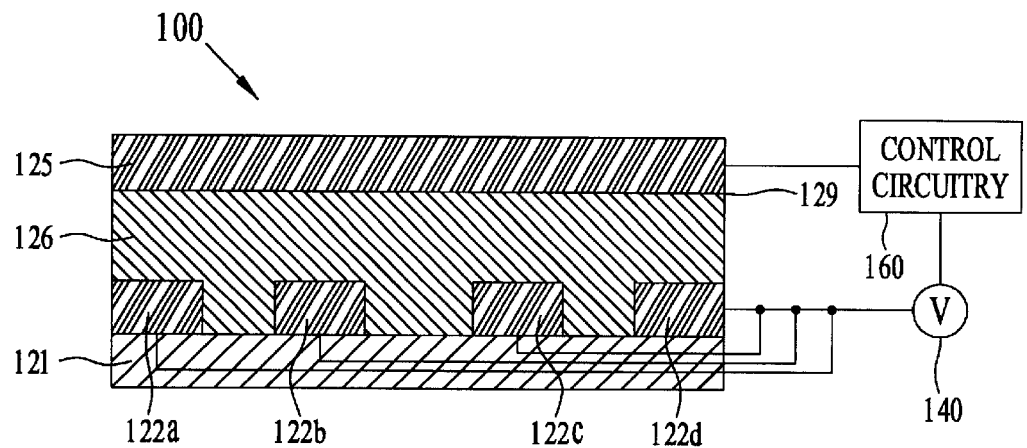
FIG. 4A is a cross-sectional side view of the solid-state light valve and tunable filter with a plurality of bottom electrodes in combination with a top electrode.
Figure 4B:
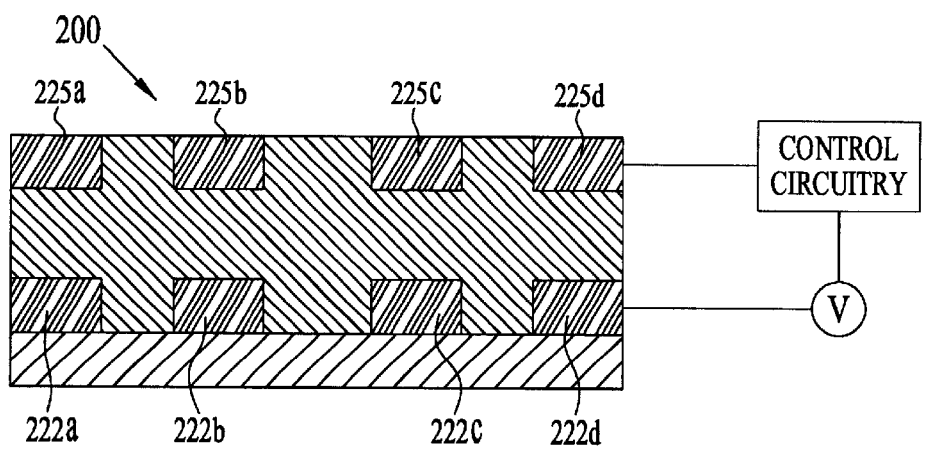
FIG. 4B is a cross-sectional side view of the solid-state light valve and tunable filter with a plurality of bottom electrodes in combination with a plurality of top electrodes; and (f)
Figure 4C:
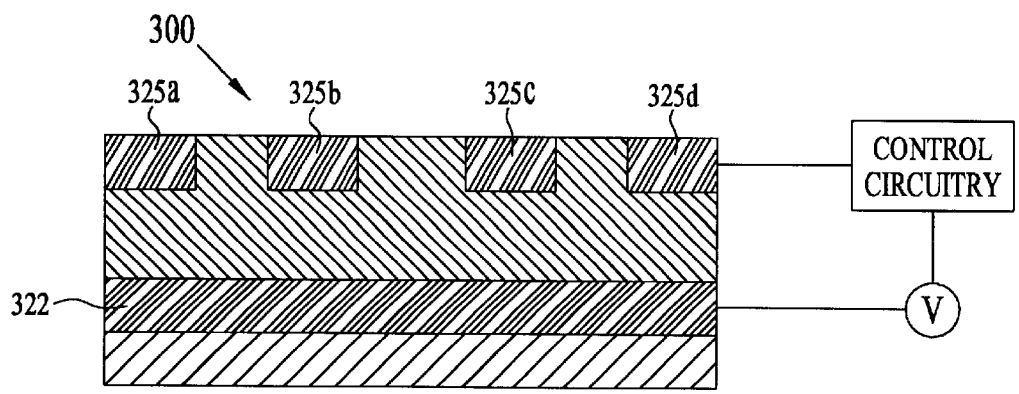
FIG. 4C is a cross-sectional side view of the solid-state light valve and tunable filter with a bottom electrode in combination with a plurality of top electrodes.

Alternative embodiments using the same general structure for a solid-state surface plasmon light valve and tunable filter are shown in FIGS. 4A–4C. In FIG. 4A, solid-state surface plasmon light valve 100 comprises a plurality of bottom electrodes 122a, 122b, 122c, 122d on substrate 121 to spatially modulate the resonant frequency of the surface plasmon at the interface 129 between the solid-state electro-optic material 126 and the top electrode 125. The applied voltage 140 may be selectively applied to each electrode by use of control circuitry 160.

FIG. 4B shows another embodiment of an all solid-state surface plasmon light valve 200 wherein a plurality of top electrodes 225a, 225b, 225c, 225d, is used in combination with a plurality of bottom electrodes 222a, 222b, 222c, 222d. Top electrodes 225a, 225b, 225c, 225d and bottom electrodes 222a, 222b, 222c, 222d may be configured aligned with one another, or non-aligned, in relative spacing.

Yet another embodiment of an all solid-state surface plasmon light valve 300, shown in FIG. 4C, uses a plurality of top electrodes 325a, 325b, 325c, 325d, in combination with a bottom electrode 322.

Embodiments that include a semiconductor layer including semiconductor devices and circuits on the adjacent substrate in order to monolithically integrate control circuitry and/or the voltage source for the light valve are also envisioned. The semiconductor may be group IV semiconductors such as silicon, germanium, tin, silicon carbide and their alloys; group III–V semiconductors; or group II–VI semiconductors. The semiconductor may have various degrees of crystallinity ranging from single crystal defect free material, polycrystalline material, or highly disordered nearly amorphous or amorphous silicon. Variations in semiconductor film thickness, appropriate patterning or doping of the semiconductor are also readily apparent from the teachings disclosed herein.

Clearly, many modifications and variations of the solid-state light valve and tunable filter are possible in light of the above teachings. It is therefore to be understood that within the scope of the appended claims the solid-state light valve and tunable filter may be practiced otherwise than as specifically described.

We claim:

1. A light valve comprising:
   a layer of solid-state electro-optic material interposed between
   top and bottom bias electrodes, wherein:
      said bottom electrode comprises a refractory metal;
      said top electrode is at least partly optically transparent;
      said top electrode and said solid-state electro-optic material form an interface which sustains a surface plasmon resonance; and
   applying a voltage to said top and bottom bias electrodes changes said surface plasmon resonance and optical properties of light reflected from said interface.

2. The light valve of claim 1 wherein at least one of said bias electrodes is separated into a plurality of electrodes.

3. The light valve of claim 2 wherein said bottom electrode is separated into a plurality of electrodes.

4. The light valve of claim 3 wherein said top electrode is also separated into a plurality of electrodes.

5. The light valve of claim 2 wherein said top electrode is separated into a plurality of electrodes.

6. The light valve of claim 1 wherein said solid-state electro-optic material is selected from the group consisting of Aurivilius oxides, lead zirconate titanate (PZT), lead lanthanum zirconate titanate (PLZT), and alloys of these materials.

\* \* \* \* \*